United States Patent
Tan et al.

(10) Patent No.: US 7,499,615 B2
(45) Date of Patent: Mar. 3, 2009

(54) SYSTEM AND METHODS FOR ROUTING OPTICAL SIGNALS

(75) Inventors: Michael Renne Ty Tan, Menlo Park, CA (US); Shih-Yuan (SY) Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/832,559

(22) Filed: Aug. 1, 2007

(65) Prior Publication Data

US 2009/0034906 A1 Feb. 5, 2009

(51) Int. Cl.
G02B 6/26 (2006.01)

(52) U.S. Cl. .............................. 385/52; 385/15; 385/27; 385/37; 385/42

(58) Field of Classification Search ................... 385/15, 385/27, 37, 52
See application file for complete search history.

(56) References Cited

U.S. PATENT DOCUMENTS

| | | | |
|---|---|---|---|
| 4,688,892 A | 8/1987 | Laakmann | |
| 4,688,893 A | 8/1987 | Laakmann | |
| 5,379,354 A | 1/1995 | Jenkins | |
| 5,396,570 A | 3/1995 | Jenkins et al. | |
| 5,525,190 A | 6/1996 | Wojnarowski et al. | |
| 5,562,838 A | 10/1996 | Wojnarowski et al. | |
| 5,737,458 A | 4/1998 | Wojnarowski et al. | |
| 5,815,627 A | 9/1998 | Harrington | |
| 5,917,596 A * | 6/1999 | Jenkins et al. | 356/491 |
| 5,982,970 A | 11/1999 | Schneider | |
| 6,785,447 B2 | 8/2004 | Yoshimura et al. | |
| 6,839,478 B2 * | 1/2005 | Huber et al. | 385/16 |
| 6,882,764 B1 * | 4/2005 | Deng et al. | 385/14 |
| 6,982,419 B2 | 1/2006 | Shlmada et al. | |
| 7,006,735 B2 | 2/2006 | Janssen | |
| 2002/0172459 A1 | 11/2002 | Bailey et al. | |
| 2003/0205065 A1 | 11/2003 | Matsuura et al. | |
| 2005/0089262 A1 | 4/2005 | Jenkins et al. | |
| 2006/0171626 A1 | 8/2006 | McNie et al. | |
| 2007/0081255 A1 | 4/2007 | Clanciotto et al. | |

OTHER PUBLICATIONS

Marcatili, et al., "Hollow Metallic and Dielectric Waveguides for Long Distance Optical Transmission and Lasers", The Bell System Technical Journal, Jul. 1964, pp. 1783-1809.
Mohebbi, et al., "Silver-coated hollow-glass waveguides for applications at 800 nm" Applied Optics, Nov. 20, 2002, vol. 41, No. 33, pp. 7031 to 7035.

* cited by examiner

*Primary Examiner*—Frank G Font
*Assistant Examiner*—Eric Wong (57) ABSTRACT

A system and methods for routing optical signals are disclosed. The system includes a first large core hollow waveguide having a reflective coating covering an interior of the waveguide and configured to guide a substantially collimated multi-mode coherent light beam. A second large core hollow waveguide with an interior reflective coating is coupled to the first waveguide with a coupling device. The coupling device is configured to redirect at least a portion of the coherent light beam from the first to the second waveguides through an optical path that is sufficiently short that a beam walk-off of the coherent light through the coupling device is less than half a width of the first large core hollow waveguide.

22 Claims, 4 Drawing Sheets

SYSTEM AND METHODS FOR ROUTING OPTICAL SIGNALS

BACKGROUND

As computer chip speeds on circuit boards increase to ever faster speeds, a communications bottleneck in inter-chip communication is becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes.

Routing the optical signals around and between circuit boards can add significant additional complexity. Marketable optical interconnects between chips have therefore proven illusive, despite the need for broadband data transfer.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

One method for forming optical interconnects between computer chips on a circuit board is to use optical waveguides formed on the circuit board. Optical waveguides can be superior to fiber optic communications for interconnecting electronics because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide(s) may be formed on a flexible substrate to create a ribbon cable having one or more optical waveguides. The optical waveguides disclosed in this application are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

In addition, typical waveguides are usually manufactured to have dimensions that are roughly proportional with the wavelength of light they are designed to carry. For example, a single mode waveguide configured to carry 1000 nm light may have its largest dimension of 1000 nm to 5000 nm (1 µm to 5 µm). Connecting waveguides of this size can be expensive and challenging. The cost of creating and connecting waveguides has historically reduced their use in most common applications. Multimode waveguides may have larger dimensions on the order of 20-60 µm for the core region. Both single and multimode waveguides have a relatively high numerical aperture (NA) of around 0.2 to 0.3 for a core and clad refractive index contrast of 0.01 to 0.02. The numerical aperture determines the divergence of beam from the emitting fiber. Thus, a larger NA will result in poor coupling as a function of fiber to fiber separation. Splitting and tapping of the guided optical beams are also difficult to accomplish using these waveguides. In accordance with one aspect of the invention, it has been recognized that an inexpensive photonic guiding device is needed that is simpler to interconnect with other waveguides and optical devices and that can significantly reduce the amount of loss in an optical waveguide.

Figure 1:
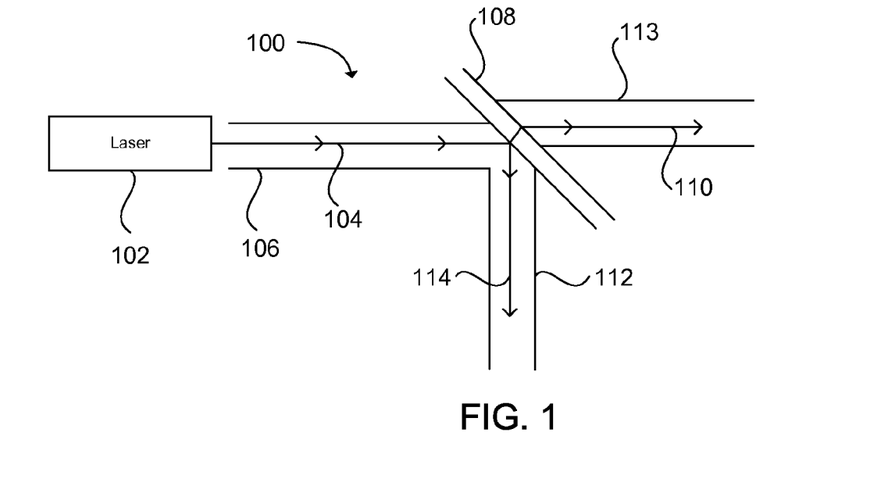
FIG. 1 is an illustration of a large core hollow waveguide coupled to a single mode laser and a beam splitter.

A substantial improvement over traditional optical waveguides formed using polymers or dielectric materials is the use of a large core hollow waveguide 100 configured to guide coherent light 104, as shown in FIG. 1. The large core hollow waveguide can have a diameter (or width and/or height) on the order of 50 to 150 or more times a wavelength of the coherent light the waveguide is configured to guide. The large core hollow waveguide can have a cross-sectional shape that is square, rectangular, round, elliptical, or some other shape configured to guide an optical signal. Furthermore, because the waveguide is hollow, the light essentially travels at the speed of light in air or a vacuum.

FIG. 1 illustrates a laser 102 emitting a single mode beam 104 into a waveguide 106. A splitter 108 is used to redirect a portion of the light beam, referred to as the reflected beam 114 into an orthogonal waveguide 112. The remaining light, referred to as the transmitted beam 110, can continue in the same direction as the original beam 104. The single mode beam may bounce between the walls of the waveguide. At each reflection, a substantial loss of the beam may occur.

Figure 2:
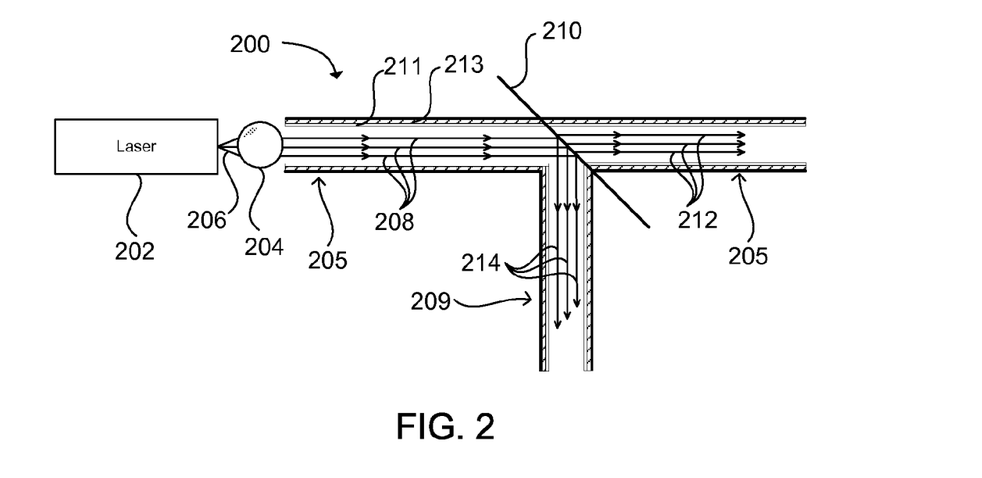
FIG. 2 is an illustration of a multi-mode laser coupled to a large core hollow waveguide having a reflective interior with a collimating lens and a coupling device in accordance with an embodiment of the present invention.

In order to decrease loss within the waveguide, a reflective coating 213 may be added to cover an interior of the waveguide 200, as shown in FIG. 2. The reflective coating can be formed using a plating, sputtering, or similar process, as can be appreciated. If the hollow waveguide comprises a polymer or other material with a low melting point, the reflective coating may be applied using a low temperature process such as sputtering, electroplating or thermal evaporation.

The reflective coating 213 can be comprised of one or more layers of metal, dielectrics, or other materials that are substantially reflective at the wavelength of the coherent light. The metals can be selected based on their reflectivity. A highly reflective layer covering the channel is desired. For example, the reflective layer may be formed using silver, gold, aluminum, or some other metal or alloy that can form the highly reflective layer. Alternatively, the reflective layer may be a dielectric stack which can be formed from one or more layers of dielectric material that is substantially reflective at a selected wavelength. Before the reflective layer is deposited, the uncoated hollow channel may be subject to a heat reflow to smooth out any surface roughness. The reflective layer may also undergo a heat reflow or similar process to smooth surface roughness in the reflective layer that may occur during the deposition process. Electro-polishing may also be used to smooth out the reflective metal surface.

If the photonic guiding device is not hermetically sealed, the reflective coating 213 may oxidize over time. Oxidation of the reflective coating can substantially reduce its reflectivity. To reduce or eliminate degradation of the metal coating's reflectivity, a protective layer 211 can be formed over the reflective coating to act as a protective. The protective layer can comprise a material that is substantially transparent at the wavelength of the coherent light. For example, the protective layer can be formed of silicon dioxide or some other material that can form a substantially air tight bond over the reflective coating. This protective layer will also reduce the propagation loss by further separating the propagating light from the lossy reflective layer.

Hollow waveguides having reflective surfaces operate differently than solid waveguides. Hollow waveguides work using the principle of attenuated total internal reflection guiding light through reflection from the reflective layer(s) and not through total internal reflection between a higher index core region and a lower index cladding region, as typically occurs in solid waveguides such as an optical fiber. The light within the hollow waveguide may be reflected at angles than what is necessary for total internal reflection, as can be appreciated.

For a circular hollow waveguide, the $TE_{01}$ mode has an attenuation per unit length that can be determined according to equation 1:

$$\alpha_c = \frac{R_s}{a\eta} \cdot \frac{\left(\frac{\omega_c}{\omega}\right)^2}{\sqrt{1-\left(\frac{\omega_c}{\omega}\right)^2}}, \quad (1)$$

where $\alpha$ is the waveguide radius, $\omega$ is the frequency of the light in radians, $\omega_c$ is the $TE_0{}'$ cut-off frequency, $\delta$ is the depth of penetration of the light into the metal, $\mu$ is the permeability of the metal, and $\eta$ is the impedance of free space. The attenuation in the hollow waveguide is due to the finite conductivity of the metal walls. $R_s$ is the surface resistivity of the metal and is given by:

$$R_s = \frac{1}{\sigma\delta} = \sqrt{\frac{\pi f \mu}{\sigma}}, \quad (2)$$

where $\sigma$ is the conductivity and f is frequency of light. It can be seen that $R_s$ increases as the square root of f.

From equation (1) above, it can be seen that the attenuation for the $TE_{01}$ mode decreases with increasing frequency. The decrease in attenuation at increasing frequencies occurs because the mode is not coupled to the guide walls at high frequencies. There are also higher order modes which exist in the hollow metal waveguide. However, these modes are very lossy since they are more coupled to the metal walls (i.e. they suffer more reflection due to their higher numerical aperture). At waveguide bends and discontinuities the TE01 mode will be attenuated due to mode conversion to the higher order modes. The lowest loss mode can be described by a set of rays which only graze the reflective wall at a steep angle from the normal resulting in a fewer number of bounces as it propagates down the waveguide. For this reason, the low loss mode has a very small numerical aperture as compared to conventional waveguide.

Ideally, a single mode laser is typically used to direct coherent light into a hollow waveguide. However, single mode lasers can be relatively expensive. It has been discovered that a less expensive, multi-mode laser such as a vertical-cavity surface-emitting laser (VCSEL) can be useful in communicating high data rate signals through relatively short distances using hollow waveguides having reflective inner surfaces. For example, multi-mode lasers can be used to direct high data rate signals through large core hollow reflective waveguides used inter-chip and inter-circuit board connections. The use of multi-mode lasers can significantly decrease the cost of optical interconnects, enabling their use to interconnect a much wider variety of electronic devices. However, multi-mode laser output can have significantly greater losses when directly coupled to a hollow metal waveguide due to multiple reflections of higher modes which propagate at large angles.

To overcome the attenuation of the higher modes emitted from a multi-mode laser 202, a collimator 204 can be placed within a path of the multi-mode coherent light rays 206 emitted from the laser. The collimator can be a collimating lens or series of lenses. In one embodiment, the collimator can be configured as a ball lens. The ball lens can have an anti-reflective coating.

The collimator 204 is configured to collimate the multi-mode beam to cause a plurality of the multiple modes, or rays 206 emitted from the laser 202 to form a collimated beam 208 in which the multiple modes travel substantially in parallel within the large core hollow waveguide 200. Collimation of the multi-mode beam can be used to efficiently couple the multimode laser to the low loss mode of the hollow metal waveguide by launching rays which are nearly parallel to the waveguide, substantially reducing the number of reflections that occur within the waveguide. Reflections of the collimated beam that do occur within the waveguide will typically be at a relatively shallow angle with respect to the waveguide walls, thus minimizing the number of reflections within the waveguide and therefore reducing the attenuation of the light within the hollow waveguide.

For example, a coherent multimode beam of 850 nm light can be transmitted through a 150 μm large core waveguide having a reflective coating with a loss on the order of 0.07 dB/cm. The numerical aperture of the light exiting the waveguide was determined to be less than 0.05. The losses of the waveguide can scale with its size. Smaller size waveguides have higher losses due to the greater number of internal reflections (bounces) in the waveguide. Thus, larger waveguides may be used to reduce loss.

Significant losses can occur within a waveguide if the optical pathway through the waveguide is not substantially straight. Bends or turns that occur in the waveguide can cause the light to have an unwanted number of bounces, causing a substantial amount of attenuation. To enable optical signals to be routed in a different direction, mirrors, splitters, and lenses can be used; see, for example, FIG. 1.

It can be seen in the illustration in FIG. 1 that a significant amount of beam walk-off can occur within the beam splitter 108. Beam walk-off is the phenomenon which occurs due to a change in an index of refraction between the hollow waveguide (with the refractive index of air or a vacuum) and the beam splitter with a refractive index of 1.5. The beam is refracted as it enters the beam splitter. The angle at which the refraction occurs depends on the difference in the index of refraction between the waveguide and the beam splitter. Beam walk-off is the lateral distance that the beam travels due to the refraction. The lateral distance is typically proportional to the thickness of the optical device, in this case the beam splitter. Beam walk-off will result in a lateral displacement of the mode within the hollow metal waveguide resulting in loss due to excitation of higher order modes. Thus it is important to minimize beam walk-off.

Beam walk-off can appear exaggerated when using comparatively small waveguides. For example, even when a relatively thin beam splitter 108 having a thickness of approximately 250 μm (¼ millimeter) is used in a 50 μm waveguide, the beam walk-off of a transmitted beam traveling through the beam splitter can be a lateral shift on the order of 75 μm, 1.5 times the thickness of the waveguide. To compensate for the lateral shift of the beam walk-off, the waveguide can be laterally shifted to form a shifted waveguide 113, as shown in FIG. 1. However, laterally shifting waveguides at each junction to compensate for beam walk-off can substantially complicate manufacturing and significantly increase costs.

FIG. 2 illustrates a system in which a multi-mode laser 202 emits a multi-mode coherent light beam 206. The multi-mode coherent light beam comprises a plurality of rays at increasing angles. The rays are sent through a collimator 204, as previously discussed, to enable the rays to be substantially parallel within the large core hollow waveguide 200. The collimator may be a single lens. Alternatively, the collimator may be comprised of a plurality of lenses configured to enable the rays in the multi-mode coherent beam to be substantially parallel. Additionally, a diameter of the beam may be condensed by the collimator to underfill the waveguide. In other words, the collimated beam can have a diameter that is less than a diameter, width, or height of the waveguide. Condensing the collimated beam to underfill the waveguide can reduce the interaction of the outer modes or rays with the reflective coating on an interior of the hollow large core waveguide and also allow for larger misalignment tolerance.

Even with the coherent beam 208 collimated and condensed to underfill the large core hollow waveguide 200, a width or diameter of the beam can fill a substantial portion of the waveguide. For example, the collimated beam may have a diameter that is greater than half a width of the waveguide. The width of the multi-mode collimated beam, relative to a single-mode beam, can reduce the misalignment tolerances of the multi-mode beam within the waveguide.

A substantially collimated multi-mode coherent light beam may be redirected from a first large core hollow waveguide 205 to a second large core hollow waveguide 209 using a coupling device 210 that is optically coupled to the first and second waveguides. The coupling device can be configured to redirect at least a portion of the light beam from the first to the second waveguide, while enabling the rest of the energy to remain in the first waveguide. In accordance with one aspect of the invention, it has been discovered that a coupling device 210 can be formed that provides an optical path used to couple the multi-mode collimated light beam 208 from the first waveguide 205 to the second waveguide 209, with the optical path being sufficiently short that a beam walk-off of the multi-mode coherent light through the coupling device is less than half a width of the first large core hollow waveguide 205.

As previously discussed, the beam walk-off is the lateral movement of the beam within the waveguide caused by refraction of the light within the coupling device. With the collimated multi-mode coherent light filling a substantial portion of the waveguide, minimizing walk-off can enable a single waveguide to be used for the original multi-mode beam 208 and the transmitted multi-mode beam 212, while directing a portion of the original beam as a reflected multi-mode beam 214 directed into the second large core hollow waveguide 209.

The amount of beam walk-off that occurs as the beam passes through the coupling device can be calculated based on a selected geometry of the beam guided through the coupling device and using Snell's law to determine how much the angle of the beam will change when passing from a first medium, such as air or a vacuum, to a second medium, the material used in the coupling device. Snell's law states that:

$$n_1 \sin\theta_1 = n_2 \sin\theta_2$$

where $n_1$ is the refractive index of the first medium, $n_2$ is the refractive index of the second medium, and $\theta_1$ and $\theta_2$ are the angles of the beam in the first and second mediums respectively with respect to a normal. The beam walk-off h is given by the expression:

$$h = \frac{t\sin(\theta_1 - \theta_2)}{\cos(\theta_2)}$$

where t is the thickness of the beam splitter.

Figure 3A:
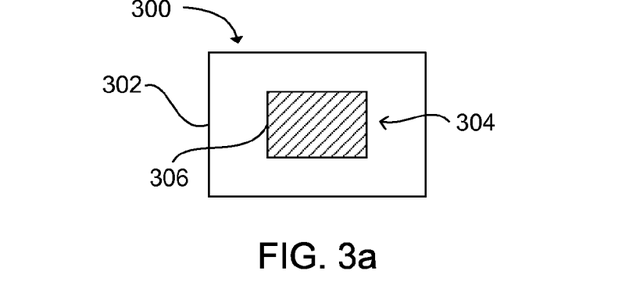
FIG. 3a is an illustration of a coupling device having a beam window area with a semi-reflective film in accordance with an embodiment of the present invention.

An exemplary coupling device 300 is illustrated in FIG. 3a. The coupling device can be formed to be sufficiently thin to limit the beam walk-off to be less than half a width of the waveguide. The coupling device can include a substrate 302. The substrate can be configured to form a beam window area 304. The beam window area can be larger than a largest dimension of a cross section of the hollow metal waveguide. A variety of different means can be used within the beam window area to allow a portion of the coherent beam to be transmitted and a portion of the beam to be reflected. For example, a semi-transparent film 306 or films, such as a dielectric film or stack, may be carried by the substrate and located over the beam window area 304. The film can be configured to transmit and reflect a desired portion of the coherent beam. The film can be adhesively coupled to the substrate over the window area. Alternatively, the film may be coupled to or embedded within a larger portion of the substrate and the substrate may then be etched away to leave the film and form the window area through which the beam can pass.

Figure 3B:
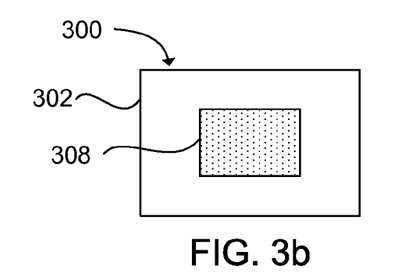
FIG. 3b is an illustration of a coupling device having a beam window area with a metallized film having dots less than a wavelength of the coherent light in accordance with an embodiment of the present invention.
Figure 3C:
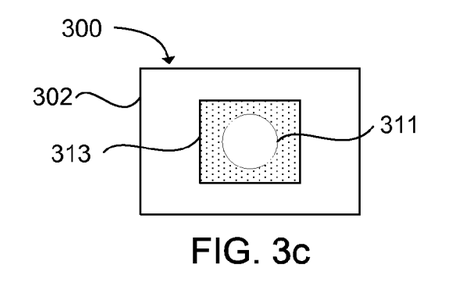
FIG. 3c is an illustration of a coupling device having a beam window area with a metallized film having an aperture in accordance with an embodiment of the present invention.
Figure 3D:
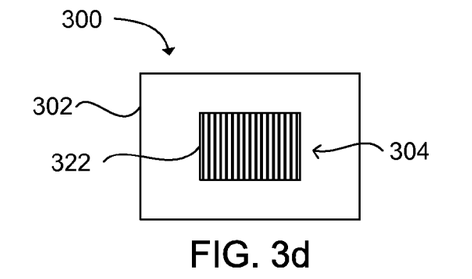
FIG. 3d is an illustration of a coupling device having a beam window area with a grating in accordance with an embodiment of the present invention.
Figure 3E:
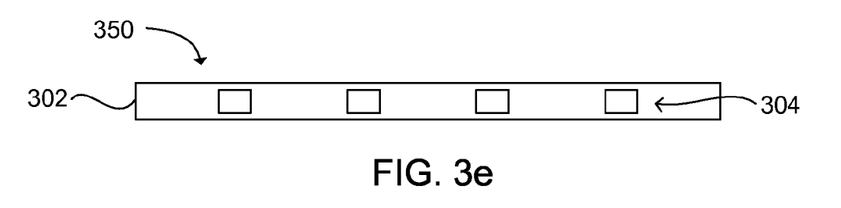
FIG. 3e is an illustration of a coupling bar having a plurality of coupling devices in accordance with an embodiment of the present invention.
Figure 3F:
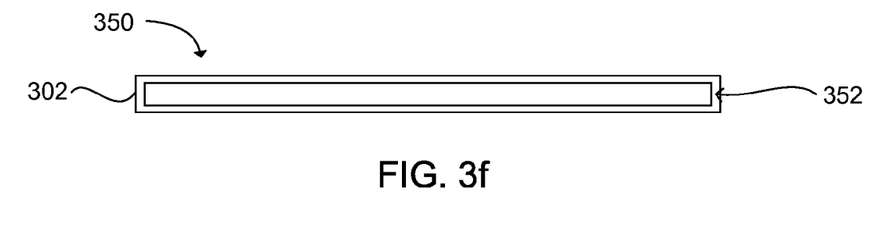
FIG. 3f is an illustration of a coupling bar having a bar beam window in accordance with an embodiment of the present invention.
Figure 3G:
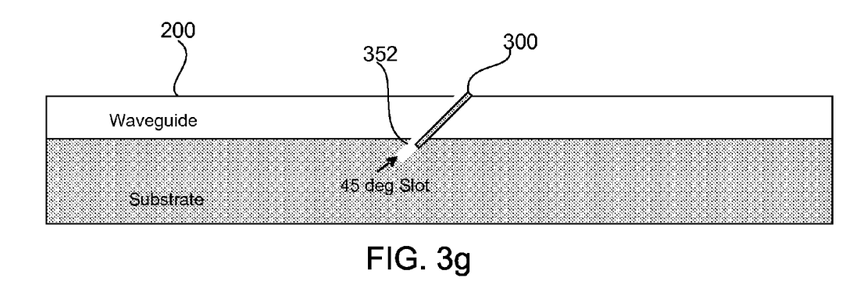
FIG. 3g illustrates a large core hollow waveguide with a slot cut at a predetermined angle to enable a coupling device to be inserted into the slot in accordance with an embodiment of the present invention.

The coupling device 300 can be inserted into the large core hollow waveguide 200 (FIG. 2) through a slot 352 cut into the waveguide at a predetermined angle, as shown in the exemplary embodiment illustrated in FIG. 3g. For example, the coupling device may be inserted at a 45 degree angle and secured to the waveguide and/or substrate with adhesive. Other types of bonding may also be used, as can be appreciated.

Returning to FIG. 3a, the film 306, or a portion of the film through which the beam will pass, can be formed to be sufficiently thin that any lateral shift of the beam through the film will be less than half a width of the waveguide. However, the film, or other redirection means, will typically be configured to provide an even smaller lateral shift. For example, a film comprising a dielectric stack can be formed on the substrate 302. The substrate can then be etched away to form the window area 304 including the film through which the beam can be transmitted. The dielectric film can have a predetermined thickness. In one example embodiment, a film thickness may be less than 0.5 µm, though films having a thickness of 5 µm or more may be used. For a film having an optical path of length 5 µm, the beam walk-off is on the order of 1.5 µm. In a waveguide having a width or diameter of 50 µm, a lateral movement of 1.5 µm of the multi-mode coherent light when passing through the coupling device would provide little to no reduction in the overall power of the coherent light beam due to mode loss or an increase in the number of reflections within the waveguide.

The film 306 may be a dielectric stack comprising multiple coatings of high and low refractive index materials. For example, the 3 to 7 alternating layers of high and low refractive index materials may be used to form a stack. The multilayer coatings can have a thickness on the order of 04 to 1.5 µm, depending on design parameters. A typical high index material is comprised of zinc selenide or titanium dioxide, with a refractive index of about 2.2. A typical low index material is magnesium fluoride, with a refractive index of about 1.38.

Additional types of coupling devices may also be used. For example, FIG. 3b illustrates a coupling device 300 with metallized film comprising a substrate 302, a transparent film 308, and a plurality of sub-wavelength diameter dots covering the transparent film. The dots may be round, square, rectangular, elliptical, or have an irregular shape so long as the major dimension of each dot has a length less than a wavelength of the light. A fill factor of the dots, i.e. how much film area is covered by the dots, can determine, in part, how much light is reflected and how much is transmitted. The amount of reflected light is also dependent on the reflectivity of the dots. For example, the dots may be made of a highly reflective metal, such as aluminum, silver, gold, and the like.

In one embodiment, a coherent light beam having a wavelength of approximately 800 nm can be directed through the metallized film 308. The film can be coupled to a substrate 302 used to support the film. The substrate and film can be placed within the large core hollow waveguide at a desired angle to reflect a portion of a collimated coherent multi-mode beam traveling through the waveguide. The film can include metal dots having a diameter of less than 500 nm. The fill factor of the dots on the transparent film can be configured based on the reflectivity of the dots and the amount of the beam that is to be transmitted and reflected. The transparent film can be selected based on its transparency at the selected wavelength and also based on its refractive index. A film having a relatively low refractive index can be used to reduce the change in angle, thereby reducing the amount of beam walk-off that occurs. The film can be configured to have a thickness that allows a lateral shift due to beam walk-off that is less than half a width of the waveguide. More precisely, the film is typically configured to have a thickness that allows a beam walk-off that is less than one tenth a width of the waveguide.

A metallized film 313 may also be used to form an aperture 311 about a center of the film to form a coupling device 300 having an aperture, as illustrated in FIG. 3c. The aperture can be substantially transparent while the metallized film area can be partially or substantially opaque. The aperture in the metallized film may be used to pass lower modes through the aperture while fully or partially reflecting higher order modes from the metallized film. The size and shape of the aperture determines how much light is coupled out and transmitted.

In another embodiment, grooves can be constructed within the window area 304 of the substrate 302 to form coupling device 300 having a grating, as shown in FIG. 3d. Unlike the previously described coupling devices, as shown in the example illustrations of FIGS. 3a-3c, the grating coupling device does not rely on a uniform film for reflection of the coherent light beam. Instead, a grating coupling device can be placed within the waveguide path and configured to reflect light at 90 degrees from a normal of the grating surface. The grating can be comprised of a plurality of reflective appendages 322 which can be constructed within the window area. The reflective appendages can be connected to the substrate 302 to provide mechanical strength. The reflective appendages may be formed of the substrate by etching areas between the appendages. The remaining substrate appendages may then be coated with a highly reflective material, such as metal, dielectrics, or a dielectric stack. Alternatively, the appendages may be constructed entirely of a material different than the substrate, such as a reflective metal or film.

Since the portion of the collimated, coherent, multi-mode beam that passes through the aperture travels in free space between the appendages, no beam walk-off occurs when using an aperture. Therefore, the thickness of the aperture is not limited due to beam walk-off, as occurs when the transmitted beam passes through another material. The appendages can have a sufficient thickness to reflect a desired amount of light and provide a preferred level of mechanical strength. For example, the appendages may be 20 µm thick. The number and width of the appendages can be selected based on beam size and the amount of reflection of the beam that is desired.

The coupling devices illustrated in FIGS. 3a-3f represent example embodiments of the present invention. Additional coupling devices representing combinations of the previously discussed embodiments, as well as additional embodiments that allow a portion of a coherent beam to be reflected in a separate direction and a portion of the beam to be transmitted with an amount of beam walk-off less than half a width of the large core hollow waveguide, are considered to be within the scope of the present invention.

Each of the example coupling devices illustrated in FIGS. 3a-3f can be positioned within the large core hollow waveguide at a desired angle relative to the coherent light beam passing through the waveguide to allow a desired amount of the beam to be coupled off to a second waveguide. The second waveguide can be optically coupled to the first waveguide at an angle that allows the reflected beam to be guided through the second waveguide in a direction that is substantially parallel with the waveguide walls. Directing the reflected beam substantially about a center of the waveguide can provide optimal power by minimizing a number of reflections from the collimated rays in the multi-mode light.

In another embodiment, an array of coupling devices can be formed. For example, FIG. 3e illustrates a plurality of beam window areas 304 that are formed in a single substrate 302 to form a coupling bar 350. The beam window areas can have a partially reflective film, as shown in FIG. 3a, a partially metallized film, as illustrated in FIGS. 3b and 3c, a grating, as shown in FIG. 3d, or some other structure that allows a portion of the coherent beam traveling through a large core hollow waveguide to be partially reflected and partially transmitted while limiting beam walk-off to less than half a width of the waveguide. Alternatively, bar beam window area comprising a single large beam window area 352 may be formed on the substrate 302, as illustrated in FIG. 3f. The use of a single large window can reduce tolerances when the coupling bar is inserted into the array of coupling devices.

Figure 4A:
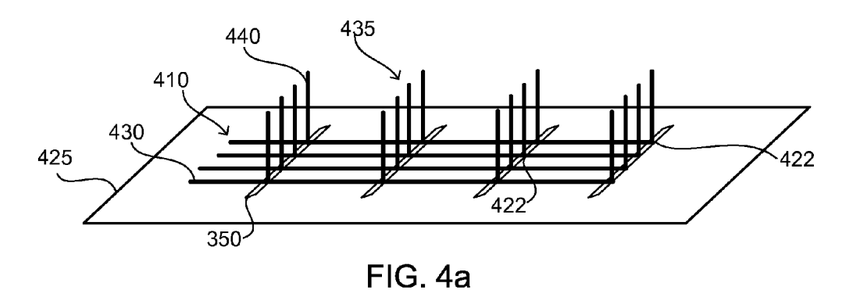
FIG. 4a is an illustration of an array of collinear large core hollow waveguides on a substrate coupled to the coupling bar in accordance with an embodiment of the present invention.

In one embodiment, the coupling bar 350 containing the array of coupling devices or the bar beam window area can be inserted into an array 410 of substantially collinear large core hollow waveguides 430, as illustrated in FIG. 4a. The array of collinear waveguides can be formed on a substrate 425, such as a circuit board. A receiving area can be made in each of the waveguides to allow the coupling bar to be inserted. For example, a slot cut at a 45 degree angle in each waveguide can allow the coupling bar to be inserted into the large core hollow waveguides in the array. The window areas 304 (or bar beam window area 352 of FIG. 3f) in the coupling bar can be lined up with the array of waveguides to allow the coherent light passing through each waveguide to be partially reflected from the window area in the respective coupling device to provide a reflected coherent beam guided through a second waveguide 440 that is angled at approximately 90 degrees relative to the waveguide on the substrate 425. This allows the formation of a second array 435 of large core hollow waveguides that can be positioned orthogonally to the first array of hollow waveguides 410. The second array can be angled with respect to the first array at approximately twice the angle of the coupling bar with respect to the light beam.

Figure 4B:
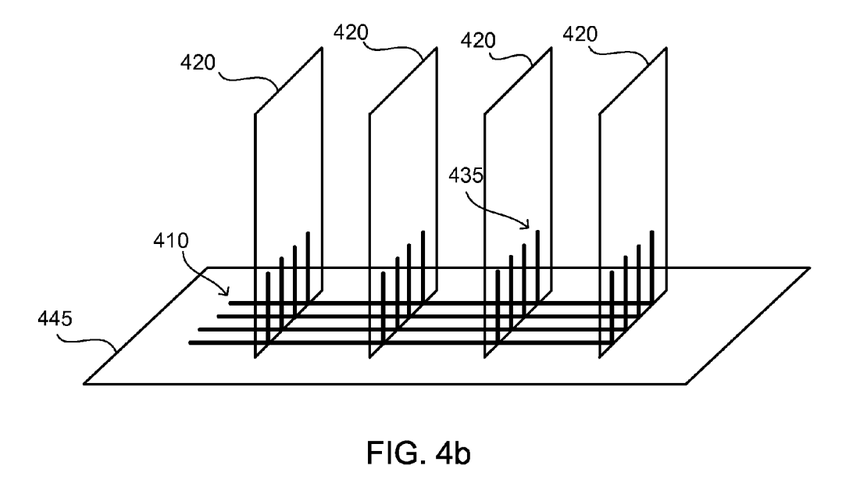
FIG. 4b is an illustration of an array of collinear large core hollow waveguides in a plane coupled to an array of daughter boards, each having an array of large core hollow waveguides outside the plane in accordance with an embodiment of the present invention.

The second waveguide 440 that is optically coupled to the first waveguide 430 can be located outside of the plane of the substrate 425 to enable a plurality of waveguides that can be coupled to each first waveguide in the array 410 located on the substrate 425. This allows a single optical signal to be redirected multiple times. For example, a small portion, such as 10% of an optical signal entering the first waveguide 430 may be redirected at each junction 422. In one embodiment, the coupling at each junction can be increased so that approximately 10% of the original energy input into the waveguide is redirected or tapped at each location. In one embodiment, an optical backplane 445 can be configured to be optically coupled to a plurality of daughter boards 420, as illustrated in FIG. 4b. A first waveguide array 410 located on the optical backplane can be coupled to a second waveguide array 435 located on each of the daughter boards.

Figure 5:
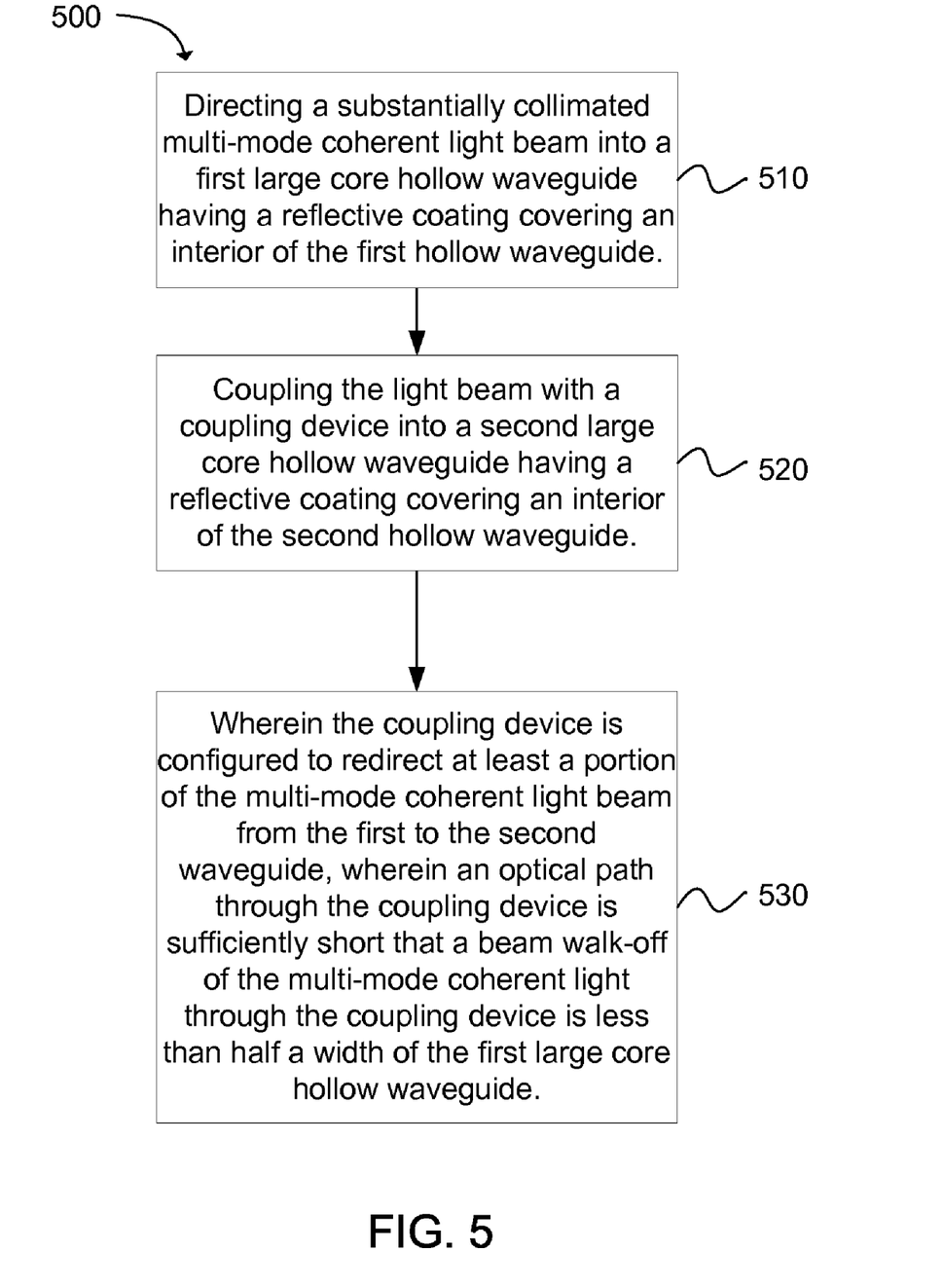
FIG. 5 is a flow chart depicting a method for routing optical signals in accordance with an embodiment of the present invention.

Another embodiment provides a method 500 for routing optical signals, as illustrated in the flow chart in FIG. 5. The method includes the operation of directing 510 a substantially collimated multi-mode coherent light beam into a first large core hollow waveguide having a reflective coating covering an interior of the hollow waveguide. The large core waveguide can have a diameter (or width and/or height) that is approximately 50 times or more a wavelength of the light. For example, the coherent light may have a wavelength of 850 nm. The waveguide may have a width of approximately 50 µm. The waveguide is not limited to 50 times the wavelength of the light. It may have a diameter or width of 250 µm or more.

The method 500 further includes the operation of coupling 520 the light beam into a second large core hollow waveguide having a reflective coating covering an interior of the hollow waveguide with a coupling device. The coupling device is optically coupled to the first and second waveguides at an angle sufficient to direct at least a portion of the multi-mode coherent light from the first waveguide to the second waveguide. The coupling device can be configured such that an optical path through the coupling device is sufficiently short that a beam walk-off of the multi-mode coherent light through the coupling device is less than half a width of the first large core hollow waveguide, as depicted in block 530.

A method for making an optical signal routing system is also disclosed. The method includes the operation of forming a first large core hollow waveguide having a reflective coating covering an interior of the hollow waveguide and configured to guide a substantially collimated multi-mode coherent light beam. An additional operation includes forming a second large core hollow waveguide having a reflective coating covering an interior of the hollow waveguide.

A coupling device can be inserted at a desired junction of the first and second large core hollow waveguides. The coupling device can be inserted at a selected angle relative to the path of the multi-mode coherent light beam to redirect at least a portion of the light beam to the second waveguide. The first and second waveguides can be optically coupled with the coupling device to enable at least a portion of the collimated multi-mode coherent light beam to be coupled from the first large core hollow waveguide to the second large core hollow waveguide. The first and second waveguides are positioned at a guiding angle relative to each other, with the guiding angle selected to minimize reflections of the coherent light beam in the second waveguide (i.e. the excitation of higher modes). Since the beam is fairly collimated, this angle corresponds to a specularly reflected beam from the coupling device to the second waveguide.

A large core hollow waveguide can be used to interconnect electronic devices located on one or more circuit boards. The electronic devices may have electrical outputs and inputs that are converted to optical output for transmission through the optical waveguides. Alternatively, the electronic devices may be optical devices that transmit and receive optical signals without a need for conversion. The large core hollow waveguide having a reflective coating on an interior of the waveguide can substantially reduce loss of the optical signal guided through the waveguide relative to solid waveguides. The reflective coating on the interior of the hollow waveguide can minimize loss caused by reflections of the optical signal within the waveguide.

Single mode lasers are typically used in conjunction with hollow waveguides to minimize reflections. However, it has been discovered that a multi-mode laser may be combined with a collimator to provide a multi-mode coherent light source having collimated rays. Use of the multi-mode laser can significantly reduce production costs.

The collimated multi-mode coherent light beam can fill a significant portion of the large core hollow waveguide. The beam can be directed about the center of the waveguide to minimize contact between the waveguide and the multi-mode laser beam and reduce a number of reflections. A portion of the beam can be redirected into adjacent waveguides using a coupling device. To minimize beam walk-off, a coupling device can be used wherein an optical path through the coupling device is sufficiently short that a beam walk-off of the multi-mode coherent light through the coupling device is less than half a width of the first large core hollow waveguide.

Such a coupling device can allow the multi-mode signal to be redirected to an adjacent waveguide without requiring a waveguide shift to compensate for beam walk-off as the beam travels through the coupling device. The ability to redirect at least a portion of the multi-mode beam without requiring waveguide shifts enables optical interconnects to be manufactured and produced at significantly reduced costs.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for routing optical signals, comprising:
a first large core hollow waveguide having a reflective coating covering an interior of the first hollow waveguide and configured to guide a substantially collimated multi-mode coherent light beam;
a second large core hollow waveguide having a reflective coating covering an interior of the second hollow waveguide; and
a coupling device optically coupled to the first and second waveguides and configured to redirect at least a portion of the multi-mode coherent light beam from the first to the second waveguide, wherein an optical path through the coupling device is sufficiently short that a beam walk-off of the multi-mode coherent light through the coupling device is less than half a width of the first large core hollow waveguide.

2. A system as in claim 1, wherein the reflective coating covering the interior of the first and second hollow waveguides is selected from the group consisting of a reflective metal, a dielectric film, and a dielectric film stack.

3. A system as in claim 1, wherein the first and second large core hollow waveguides have a cross sectional dimension that is greater than 50 times a wavelength of the coherent light beam.

4. A system as in claim 1, wherein the optical path through the coupling device is sufficiently short that the beam walk-off of the multi-mode coherent light through the coupling device is less than one tenth the width of the first large core hollow waveguide.

5. A system as in claim 1, wherein the coupling device comprises a substrate having a beam window area.

6. A system as in claim 5, further comprising a semi-transparent film substantially covering the beam window area, wherein the semi-transparent film has a thickness that provides an optical path through the semi-transparent film that is sufficiently short that the beam walk-off of the multi-mode coherent light passing through the semi-transparent film is less than half the width of the first large core hollow waveguide.

7. A system as in claim 6, wherein the semi-reflective film is a dielectric stack comprising a plurality of layers of dielectric film.

8. A system as in claim 5, further comprising a metallized film configured to substantially cover the beam window area, wherein the metallized film comprises a film that is substantially transparent to the coherent light beam, further comprising a plurality of metal dots covering a portion of the substantially transparent film, wherein the dots have a major dimension that is less than a wavelength of the coherent light beam and wherein the substantially transparent film has a thickness that provides an optical path through the substantially transparent film that is sufficiently short that a beam walk-off of the multi-mode coherent light passing through the substantially transparent film is less than half the width of the first large core hollow waveguide.

9. A system as in claim 8, further comprising a substantially transparent aperture within the metallized film configured to transmit at least a portion of the coherent light through the aperture area and reflect the coherent light outside of the aperture area.

10. A system as in claim 5, further comprising a grating coupling device configured to substantially cover the beam window area, wherein the grating coupling device comprises a plurality of reflective appendages configured to reflect light, with each reflective appendage separated by an open area configured to transmit light.

11. A system as in claim 10, wherein the reflective appendages are comprised of the substrate having an appendage reflective coating.

12. A system as in claim 11, wherein the appendage reflective coating is selected from the group consisting of a reflective metal, a dielectric film, and a dielectric stack.

13. A system as in claim 1, wherein the coupling device further comprises a coupling bar having an array of coupling devices.

14. A system as in claim 1, wherein the coupling device further comprises a coupling bar having a bar beam window area.

15. A system as in claim 13, wherein the coupling bar is configured to be optically coupled to a first array of substantially collinear large core hollow waveguides located in a plane.

16. A system as in claim 15, further comprising a second array of substantially collinear large core hollow waveguides located outside the plane of the first array and optically coupled to the coupling bar, wherein each waveguide in the first array is optically coupled to a waveguide in the second array through the bar beam window area in the coupling bar.

17. A method for routing optical signals, comprising:
directing a substantially collimated multi-mode coherent light beam into a first large core hollow waveguide having a reflective coating covering an interior of the first large core hollow waveguide; and
coupling the light beam into a second large core hollow waveguide having a reflective coating covering an interior of the second hollow waveguide with a coupling device;
wherein the coupling device is optically coupled to the first and second waveguides and configured to redirect at least a portion of the multi-mode coherent light beam from the first to the second waveguide, wherein an optical path through the coupling device is sufficiently short that a beam walk-off of the multi-mode coherent light through the coupling device is less than half a width of the first large core hollow waveguide.

18. A method as in claim 17, further comprising coupling the coherent light beam into the second large core hollow waveguide with the coupling device, wherein the coupling device comprises a substrate having a beam window area, wherein the beam window area includes a beam redirection device selected from the group consisting of a semi-transparent film, a dielectric film, a dielectric stack, a metallized film having a metal covering comprising metal dots with a major dimension less than a wavelength of the coherent light, a metallized film aperture, and a grating coupling device.

19. A method as in claim 17, further comprising directing the substantially collimated multi-mode coherent light beam from each waveguide in a first array of collinear large core hollow waveguides located in a plane to a second array of collinear large core hollow waveguides located outside the plane using a coupling bar having an array of coupling devices, with each coupling device aligned between a waveguide from the first array and a waveguide from the second array.

20. A method as in claim 17, further comprising coupling the coherent light beam from the first to the second waveguide with the coupling device, wherein the optical path through the coupling device is sufficiently short that the beam walk-off of the multi-mode coherent light through the coupling device is less than one tenth the width of the first large core hollow waveguide.

21. A method for making an optical signal routing system, comprising:

forming a first large core hollow waveguide having a reflective coating covering an interior of the first hollow waveguide and configured to guide a substantially collimated multi-mode coherent light beam;

forming a second large core hollow waveguide having the reflective coating covering an interior of the second hollow waveguide;

inserting a coupling device at a desired junction of the first and second large core hollow waveguides, wherein the coupling device is inserted at a selected angle relative to a path of the multi-mode coherent light beam; and optically coupling the first and second waveguides with the coupling device to enable at least a portion of the collimated multi-mode coherent light beam to be coupled from the first large core hollow waveguide to the second large core hollow waveguide, wherein the first and second waveguides are positioned at a guiding angle relative to each other, with the guiding angle being approximately twice the selected angle to minimize reflections of the coherent light beam in the second waveguide, and wherein an optical path through the coupling device is sufficiently short that a beam walk-off of the multi-mode coherent light through the coupling device is less than half a width of the first large core hollow waveguide.

22. A method as in claim 21, further comprising forming a first array of substantially collinear large core hollow waveguides located in a plane and optically coupling each waveguide in the first array to a second array of substantially collinear large core hollow waveguides located outside the plane using a coupling bar comprising a plurality of coupling devices, with each coupling device on the coupling bar aligned between a waveguide in the first array and a waveguide in the second array.

* * * * *